July 5, 1966 R. T. KEATING 3,259,120
PIE-BAKING FACILITY
Filed April 29, 1964 2 Sheets-Sheet 1
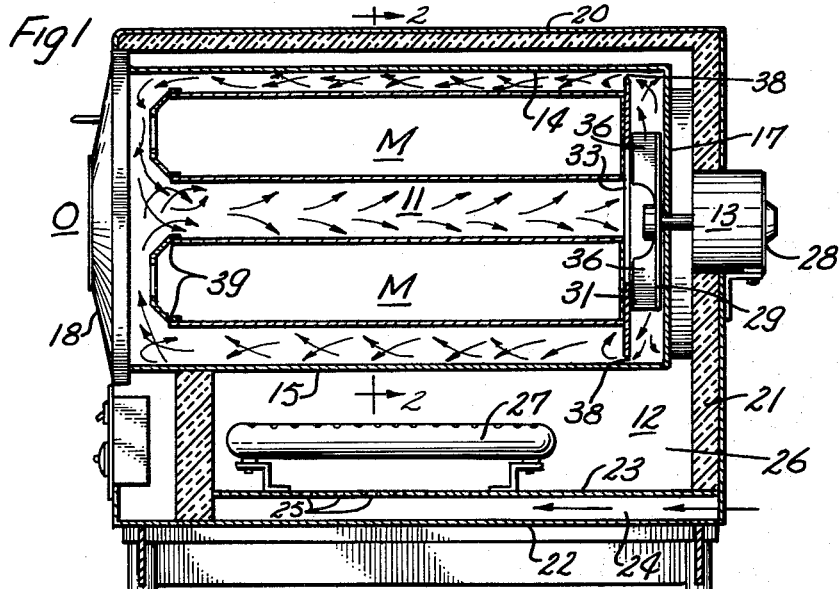
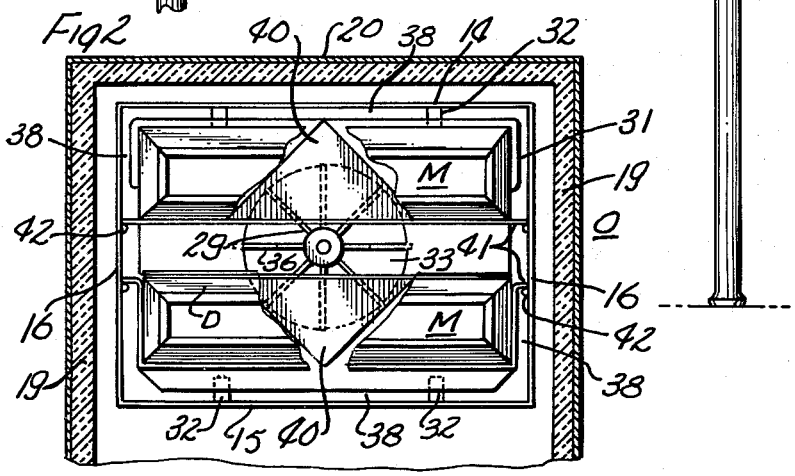
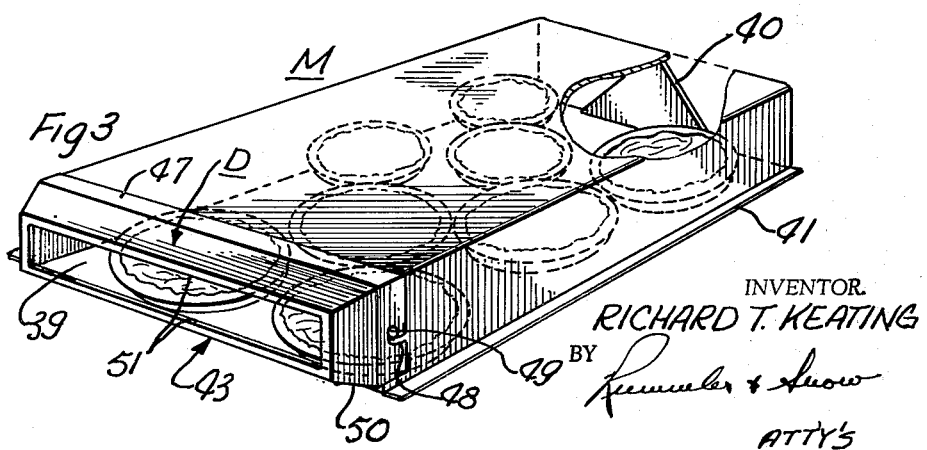
INVENTOR.
RICHARD T. KEATING
ATTY'S

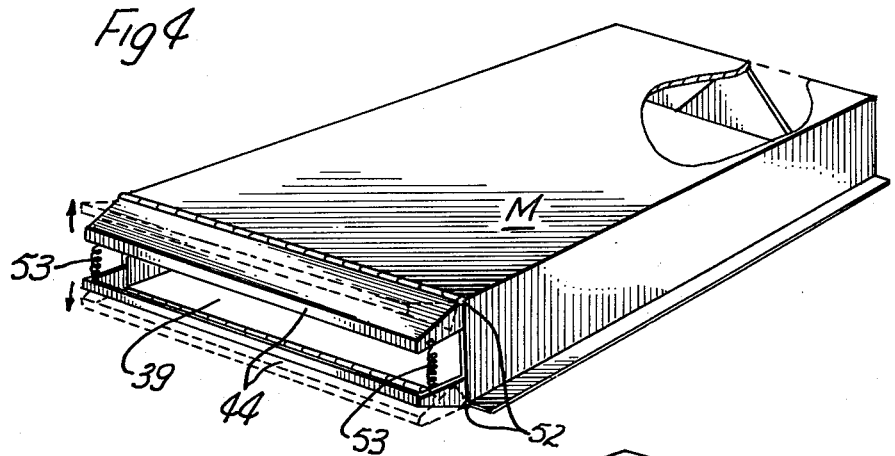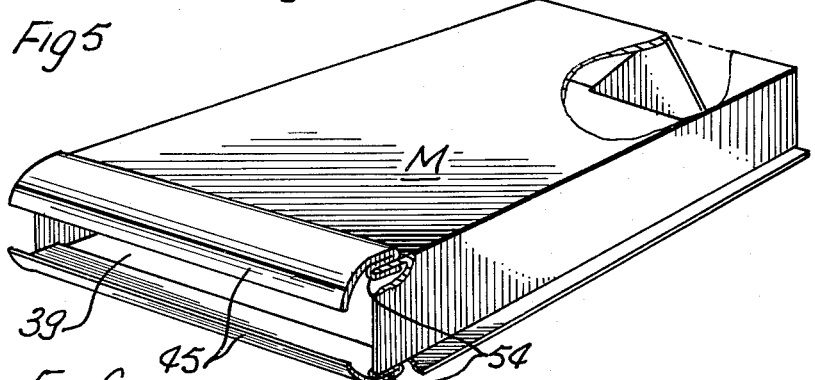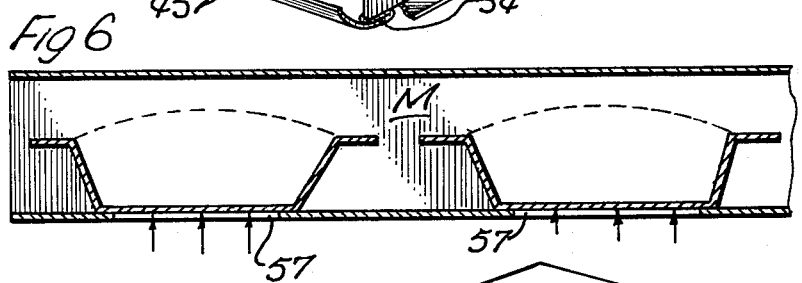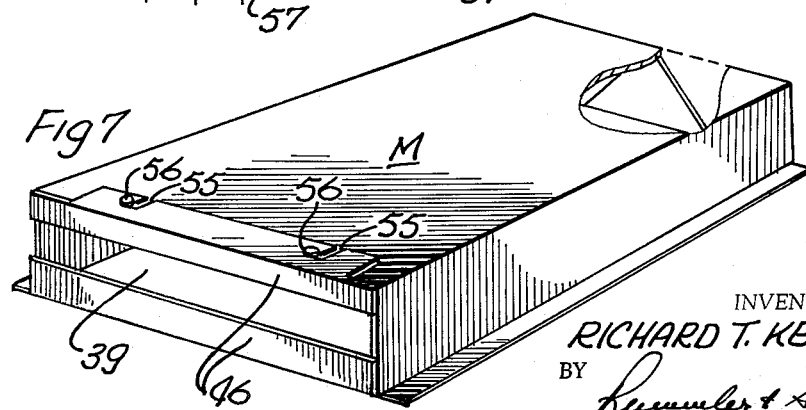

United States Patent Office 3,259,120
Patented July 5, 1966

3,259,120
PIE-BAKING FACILITY
Richard T. Keating, 144 N. Cuyler Ave., Oak Park, Ill.
Filed Apr. 29, 1964, Ser. No. 363,560
7 Claims. (Cl. 126—21)

This invention relates to facilities for the baking of pies, especially of the frozen type, in muffled, forced circulation ovens.

The thorough and uniform baking of pies, especially the frozen type, always has been one of the problems in commercial production. Such pies when cooked in conventional-type baking ovens must first be thawed or else cooked slowly to melt the frozen bottom crust so as to have a uniformly cooked finished product. For this reason frozen pies cannot be satisfactorily cooked in the faster high velocity type of muffled oven, the top of the pie becoming cooked and burned before the bottom crust is melted and baked. Also, in the case of meringue pies, the top cover of meringue is blown off or mis-shapened by the high velocity air stream in the usual muffled oven and a spoiled product results.

The main objects of this invention, therefore, are: to provide an improved facility for the baking of frozen pies in a muffled high velocity oven; to provide an improved auxiliary pie-baking muffle structured for use in combination with a high velocity oven to prevent direct engagement of the pie with the ambient turbulent air circulating in the oven; and to provide an improved auxiliary muffle of this kind of such simple and practical construction as to make its manufacture very economical and make its use in muffled high velocity ovens extremely facile and efficient.

Specific embodiments of this invention are shown in the accompanying drawings in which:

FIGURE 1 is a vertical, longitudinal sectional view of a high velocity oven, such as that shown in my Patent No. 3,074,393, including the pie baking facilities of the present invention;

FIG. 2 is a transverse, cross-sectional view of the same, taken on the plane of the line 2—2 of FIG. 1;

FIG. 3 is a perspective view of a muffle constructed in accordance with this invention and shown with one type of air flow deflector removably positioned over the open front end of the muffle;

FIGS. 4 and 5 are perspective views of muffles constructed in accordance with this invention, showing different arrangements of air deflectors for the open front end of the muffle;

FIG. 6 is an enlarged, fragmentary, cross-sectional view of a muffle constructed in accordance with this invention but showing a modified form of the bottom wall of the muffle; and FIG. 7 is a perspective view of a muffle constructed in accordance with this invention, but showing another form of front-end deflector.

The essential concept of this invention is to provide a frozen pie baking facility, for forced air circulation ovens, comprising a shallow, box-type muffle having an open front end and structured so that during a baking operation in an oven having a high velocity air circulation there can be no entrance into the muffle of the ambient turbulent air-flow.

A pie-baking facility embodying the foregoing concept comprises a high velocity oven O and a plurality of shallow, box-type muffles M structured for opposed spacing in the oven O and with front-end deflectors D positioned thereon so as to prevent entrance into the muffles M of the ambient turbulent air flowing in the oven and around the muffles.

The oven O, as here shown in FIGS. 1 and 2, is known as a muffled oven and comprises a closed baking chamber 11 surrounded by a heating chamber 12, an impeller type fan 13 being mounted at one end of the apparatus for effecting a high velocity air flow within the baking chamber 11.

The baking chamber 11, as herein shown, is of rectangular shape defined by top and bottom walls 14 and 15, side walls 16, one rear end wall 17 and an opposite front-end door 18.

The heating chamber 12 is defined by the insulated side walls 19, top wall 20, a rear end wall 21 and a pair of spaced bottom plates 22 and 23 forming an air inlet duct 24 between them leading through opening 25 to a compartment 26 wherein is mounted a gas burner 27.

The impeller-type fan 13 comprises a motor 28 mounted on the rear wall 21 of the oven so as to position the impeller 29 between the baking chamber end wall 17 and a baffle plate 31. This baffle plate 31 is of flat generally rectangular shape and is fixed in parallel relationship to the end wall 17 by brackets 32 to provide a fan housing. The baffle plate 31 is also formed with a central opening 33, of a diameter somewhat smaller than the diameter of the impeller 29, to provide a centrally disposed inlet for air from the chamber 11 to the impeller blades 36. The respective peripheral portions of the baffle plate 31 extend to within a short distance from the respective walls of the baking chamber 11 to form restricted air-discharge channels 38 between the peripheral, and relatively abrupt, corners of the edges of the baffle 31 and the opposed faces of the said walls. It is such restricted air channels 38 that create the desired violent turbulent air flow throughout the baking chamber 11, as indicated by the arrows in FIG. 1, and the principles and advantages involved are fully described in my before mentioned Patent No. 3,074,393.

The muffle M, as shown in each of the herein illustrated adaptations, is a comparatively shallow, four-sided box-type structure with a front end-opening 39, a rear end-closure member 40, and oven-ledge-contacting marginal flanges 41 by means of which the muffles are slidably supported within the oven in the same manner as the conventional wire grids or shelves.

As shown, the muffle M is formed of sheet metal with longitudianl and transverse dimensions such as will permit the appropriate use thereof in place of the conventional wire grid shelves, the laterally projecting flanges 41 resting on the conventional ledges 42 struck out or otherwise formed on the side walls 16 of the baking chamber 11. The front opening 39 is normally unobstructed so as to make it convenient to insert and remove a plurality of pies into and from each muffle M. The end closure 40 is shown as a triangular member disposed with its base secured medially of the muffle wall from which the flanges 41 project and with its apex secured to the opposite muffle wall, this closure member 40 being dimensioned to present an area not less than that of the opposed segment of the baffle opening 33. Thus, as is most clearly shown in FIG. 2, when a pair of these muffles M are arranged in reverse spaced opposition in the oven O, one inverted above the other with their rearward ends against the baffle 31 these triangle end members 40 close off that portion of the baffle opening 33 within the end area of the muffle and preclude air being pulled through the muffle by the fan 13.

The marginal projections 41, as here shown, are narrow flanges integral on and extending outwardly from the opposite side edges of the same wall of the muffle M as that wherewith the base of the triangular closure 40 is integrated. These flange projections 41, extending outwardly of the muffle M and along the sides thereof in the plane of one of the broad walls permit a pair of muffles M to be positioned in an oven O in reversed spaced relationship on the medial pair of rack or shelf guides 42, as shown in FIG. 2. A pair of the muffles, so positioned in the oven, disposes the end closures 40 in opposedly, spaced relationship with respect to the center of the baffle opening 33. Hence, only a middle segment of the baffle opening 33, registering with the space between the muffles M, remains uncovered. Accordingly, it is through this space only that the air-flow is drawn from the oven by the impeller 29, as indicated by the arrows in FIG. 1. Because of this opposed positioning of the closures 40 no air-flow can be drawn into or through the muffles M.

The deflectors D, of one form or another, are adapted for positioning over the front or open-end 39 of each muffle M, to so deflect the turbulent air-flow in the oven across the open-end of the muffle as to preclude the heated air from entering the muffle and thereby causing an uneven baking effect from the front of the muffle toward the rear. Four kinds of these deflectors D are shown in the drawings. Only one of these, 43 of FIG. 3, is a single piece. All of the others, 44, 45 and 46, FIGS. 4, 5 and 7 respectively, are pairs of identical parts. Of the various forms of deflectors only the form 44 (FIG. 4) is permanently fixed on the muffle M. The others, pairs 45 and 46, along with the 43 unit, are removably positioned on the muffle.

The unitary deflector 43 is made of sheet-metal, with a rectangular-shaped base part 47 contoured to telescope over the open end 39 of a muffle M. Bayonet slots 48, in the end portions of the base part 47, seat over pins 49 on the side walls of the muffle M to secure the deflector 43 in functioning position. It should be noted that this base part 47 is structured so that when in place, on the muffle M, the lowermost longitudinal portion of the base part is shortened, longitudinally, so as to extend into the muffle and that this flange-like member abuts the adjacent wall of the muffle interiorly whereas the other portions of the base part 47 overlap the end of the muffle exteriorly. This is necessary because, in positioning the deflector 43, it has to be possible for the pins 49 to enter the horizontal portions of the bayonet slots 48 and allow the pins to settle into the vertical portions of these slots. The pins 49 are centrally located on the sides of the muffle so that the deflector 43 is reversible for either position of the muffle M. As shown, the deflector 43 has a pyramidal or outwardly-tapered extension 50 which provides a sufficiently gradual turn to the air flow around the front end of the deflector 43 as to preclude the entrance of air through the remaining opening 51. Such an opening 51, however, is necessary to afford observation of the pies during the baking operation.

The deflector 44 (FIG. 4) comprises a pair of trapezoidal canopy-shaped parts swingably attached by suitable hinges 52 along the opposite longitudinal edges defining the front end-opening 39 of the muffle. Springs 53 normally bias these parts toward each other to present rather rounded or gradual turn to the air flow across the front end 39 of the muffle and for that purpose the length of these parts is the same as the width of the muffle. As shown, the rear edges of these parts abut the forward edges of the side walls of the muffle and dispose the two parts in appropriately spaced relation, as biased by the springs 53 as indicated by the full outline in FIG. 4. This leaves an ample longitudinal opening between the deflector parts to permit observation of the goods being baked during the cooking operation. One end of each of the springs 53 may be detached to permit the swinging of the deflector parts upwardly and downwardly, into positions shown in dotted outline in FIG. 4, to expose the front open-end 39 of the muffle M for the convenient insertion and removal of the goods being baked.

The deflector 45 (FIG. 5) comprises a pair of arcuate-shaped parts each of which has one of its longitudinal margins 54 double upon itself twice to provide a closed 5-section for removably seating over the long edges of the parallel top and bottom walls of the muffle which define the front end-opening 39. These parts of the deflector 45 are slightly shorter than the opening 39 and are easily positioned on the muffle after the pies have been placed in the muffle to prevent entry of the turbulent air flow of the oven into the muffle. Likewise, these parts are easily removed after the cooking of the pies to allow for facile removal of the pies from the muffle.

The deflector 46 (FIG. 7) comprises a pair of angle-shaped parts each with one flange shorter than the other and with pairs of bayonet slots 55 in the shorter flange for seating over pins 56 on the exposed faces of the top and bottom walls of the muffle M. The long flange of each deflector 46 is proportioned to extend the length of the front end of the muffle and when in place, these parts of the deflector extend inwardly from the top and bottom edges of the muffle a sufficient distance to preclude the entrance of the high velocity oven air into the muffle as it turns over the end of the muffle under the influence of the fan 13.

The modification of the muffle M shown in FIG. 6 provides openings 57 in several parts of the bottom wall of the muffle. These would be arranged so that the normally-positioned pies would have their bottoms more directly exposed to the heated turbulent air flow through the oven O. Here, these openings are shown as circular cut-outs somewhat less than the bottom area of the pies and located so as to accommodate a maximum number of pies in each muffle. An advantage of this arrangement is the more rapid melting of the bottoms of frozen pies although in such cases the muffles would not be reversible and would have to be designed for particular position use in the oven O.

In use, the muffles M, with the deflectors D removed—or merely retracted as in the adaptation shown in FIG. 4—permit a facile insertion and removal of the desired number of pies, somewhat as shown in FIG. 3. This would be done in the usual manner. After the pies are in place in the muffle M, a deflector D is positioned over the front open-end 39 of each of the muffles that is to be involved in a cooking operation and the loaded muffles are placed in the oven O in the same manner as and in place of the usual wire racks or shelves with which the oven is normally equipped.

When a pair of the muffles M are so stacked in the oven O and abutted endwise against the baffle plate 31, as shown in FIG. 2, the respective closures 40 are disposed in oppositely-extending relationship. Thus, these closures 40 overlap oppositely disposed segments of the inlet opening 33 in the baffle plate 31 and confine the air suction of the impeller 29 to the area between the opposed base parts of the respective baffles. The air flow within the oven is thus from back to front along the top, bottom and side walls, as caused by the baffle plate 31, and from front to rear in the space between the muffles M. The muffles are thus heated exteriorly by convection and radiation from the oven walls. The goods being baked in the muffles, however, is heated mainly by radiation from the muffle walls and only the bottoms of the goods, such as frozen pies is heated by the more rapid direct conduction from the muffle bottom wall.

The main advantages of this invention reside in the improved muffle or baking facility for use with muffled-type ovens, wherein air circulation is at a high velocity, whereby such ovens can be used for making frozen pies; and in the muffle-high velocity oven combination whereby frozen pies can be baked directly, without prior thawing, and at a faster rate than heretofore possible. Further advantages reside in the fact that the use of the improved muffle permits the baking of meringue pies at a faster rate and without danger of the meringue becoming misshaped by the high velocity air flow which is the principal factor providing a greatly shortened cooking time.

Although several embodiments of the improved muffle have been herein shown and described, and only one arrangement of the oven-muffle combination is herein shown, it will be understood that details of the constructions and arrangements illustrated may be altered or omitted without departing from the spirit of the invention as defined by the following claims:

I claim:

1. In combination with a high velocity oven, a pie-baking facility comprising a shallow box-type muffle structured with a front end opening to permit the insertion and removal of pies, means for suspending said muffle within said oven in spaced relation with the top, bottom, and sides thereof, and deflector means positioned over the front end opening of the muffle to dispose upper and lower deflecting portions overhanging said opening for diverting from entrance into the front end of the muffle the turbulent air flow circulating around the muffle in the said high velocity oven.

2. A pie-baking facility as set forth in claim 1 wherein the muffle bottom is provided with openings coinciding with the bottoms of the pies disposed therein so as to expose the bottom of the pie plates directly to the normal air-flow within the oven.

3. A pie-baking facility as set forth in claim 1 wherein the deflector means comprises a rectangular-shaped base portion contoured for telescopic positioning over the front end-opening of the muffle and having an integrated outwardly-extending inwardly-tapering extension having top, bottom and side elements defining at its outer perimeter a reduced-area elongated opening registering with the muffle end-opening to permit observation of the pies during the baking operation.

4. In combination with a high velocity oven, a pie-baking facility comprising a shallow box-type muffle structured with a front end-opening to permit the insertion and removal of pies, means for suspending said muffle within said oven in space relation with the top, bottom and sides thereof, and a deflector means on said muffle comprising a pair of substantially identical parts oppositely positioned on the upper and lower longitudinal edges of the said front end-opening for deflecting from entrance into the said front end-opening the air-flow circulating around the muffle in the said high velocity oven.

5. A pie-baking facility comprising, a high velocity oven having rack-supporting ledges on the inner surfaces of its side walls, a baffle plate disposed in the oven substantially parallel with one end of the oven and with the periphery of the baffle plate closely spaced to the side walls of the oven to form restricted air-flow passages between the periphery of the baffle plate and the said oven side walls, the baffle plate having a central opening therein, a motor-driven fan journaled in the oven rearwardly of the baffle plate to draw air through the baffle plate central opening and discharge it radially and thence forwardly through the said peripheral restricted air-flow passages, in combination with a muffle slidably mounted on the said rack supporting ledges, said muffle being structured with a front end-opening to permit the insertion and removal of pies, and a deflector positioned over the front end-opening of the muffle to dispose inwardly angled portions for deflecting from entrance into the muffle the turbulent air-flow circulating within the oven.

6. A pie-baking facility as set forth in claim 5 wherein the rear end of the muffle is provided with closure means adapted to overlap that portion of the baffle-plate opening within the end area of the muffle and thereby prevent suction of oven air through the muffle by the said fan.

7. A pie-baking facility comprising,
 (a) a closed rectangular baking chamber having top, bottom, side and end walls,
 (b) a continuous heating chamber spaced from and surrounding the top, bottom, and side walls of the baking chamber,
 (c) a heating means in the lower portion of the heating chamber,
 (d) a centrifugal impeller mounted within the baking chamber adjacent one end wall and parallel therewith,
 (e) means for driving the impeller to effect a peripheral discharge of air therefrom against the walls of the baking chamber,
 (f) a flat rectangular baffle plate disposed substantially parallel with and closely adjacent to the impeller on the side thereof opposite said one end wall,
  (1) the baffle having a central opening therein for air to be pulled axially into the impeller from the baking chamber,
  (2) the baffle plate having peripheral edges juxtaposed to the adjacent walls of the baking chamber and thereby defining restricted air-flow passages at the edges of the baffle plate so as to create a violently turbulent air circulation throughout the baking oven, and
 (g) a plurality of muffles removably supported in vertically spaced relationship in the baking chamber,
  (1) each muffle being a shallow, box-type structure with a front end-opening to permit the insertion and removal of pies, and
  (2) each muffle mounting a deflector over the front end-opening to prevent the air-flow in the baking oven from entering the muffle during the baking operation.

References Cited by the Examiner

UNITED STATES PATENTS

| | | | |
|---|---|---|---|
| 1,627 | 6/1840 | Chilsom | 126—274 |
| 240,639 | 4/1881 | Austin | 126—274 |
| 449,432 | 3/1891 | Watson | 126—274 |
| 765,728 | 7/1904 | Fox | 263—47 |
| 1,112,943 | 10/1914 | Stone | 220—73 |
| 2,969,055 | 1/1961 | Martin | 126—274 |
| 3,046,913 | 7/1962 | Wilson | 107—57.4 |

FOREIGN PATENTS

| | | |
|---|---|---|
| 207,463 | 4/1957 | Australia. |

FREDERICK L. MATTESON, JR., *Primary Examiner.*

E. G. FAVORS, *Assistant Examiner.*